(12) United States Patent
Fabre et al.

(10) Patent No.: US 7,788,806 B2
(45) Date of Patent: Sep. 7, 2010

(54) PROCESS FOR MANUFACTURING A BLISK AND MOLD FOR IMPLEMENTING THE PROCESS

(75) Inventors: Adrien Fabre, Paris (FR); Stephane Rousselin, Hericy (FR)

(73) Assignee: SNECMA, Paris (FR)

( * ) Notice: Subject to any disclaimer, the term of this patent is extended or adjusted under 35 U.S.C. 154(b) by 514 days.

(21) Appl. No.: 11/776,256

(22) Filed: Jul. 11, 2007

(65) Prior Publication Data

US 2008/0016688 A1    Jan. 24, 2008

(30) Foreign Application Priority Data

Jul. 19, 2006    (FR)    ................................ 06 06545

(51) Int. Cl.
   *B22D 19/00*    (2006.01)
(52) U.S. Cl. .................. 29/889.23; 29/889.2; 29/889; 29/889.21; 29/889.22; 29/889.7
(58) Field of Classification Search ............ 29/423, 29/525.14, 525.15, 889.23, 889.2, 889.21, 29/889.7, 889.71
   See application file for complete search history.

(56) References Cited

U.S. PATENT DOCUMENTS

| | | | | |
|---|---|---|---|---|
| 2,097,314 A | * | 10/1937 | Wales ........................... | 164/11 |
| 4,083,655 A | * | 4/1978 | Tempere .................. | 416/196 R |
| 4,494,287 A | * | 1/1985 | Cruzen et al. ............ | 29/889.21 |
| 4,592,120 A | | 6/1986 | Egan et al. | |
| 4,674,552 A | * | 6/1987 | Howe .......................... | 164/11 |
| 4,987,944 A | * | 1/1991 | Parks .......................... | 164/10 |
| 5,259,728 A | * | 11/1993 | Szpunar et al. ................. | 416/2 |
| 6,830,435 B2 | * | 12/2004 | Goetzfried et al. .......... | 416/189 |
| 6,969,238 B2 | * | 11/2005 | Groh et al. .............. | 416/213 R |
| 7,156,609 B2 | * | 1/2007 | Palley ........................ | 415/4.2 |

FOREIGN PATENT DOCUMENTS

EP    1 000 696 A2    5/2000

\* cited by examiner

*Primary Examiner*—David P Bryant
*Assistant Examiner*—Christopher Besler
(74) *Attorney, Agent, or Firm*—Oblon, Spivak, McClelland, Maier & Neustadt, L.L.P.

(57) ABSTRACT

A process for manufacturing an integrally bladed disk for a turbomachine rotor by friction welding is disclosed. The manufacturing process includes arranging a plurality of blades in the form of a ring in a mold having symmetry of revolution; casting a degradable material, preheated to a temperature above its melting point, onto the ring of blades in the mold; extracting the molded ring which is obtained after the degradable material has solidified; welding the molded ring onto a disk; and eliminating the degradable material.

12 Claims, 3 Drawing Sheets

PROCESS FOR MANUFACTURING A BLISK AND MOLD FOR IMPLEMENTING THE PROCESS

BACKGROUND OF THE INVENTION

The present invention relates to the manufacture of an integrally bladed disk, especially for a turbomachine rotor. It relates more particularly to a process for manufacturing such a disk by friction welding.

Two types of bladed disk exist. A first type of bladed disk is obtained by mechanically fastening removable blades onto a disk, the disk and the blades comprising means for fastening them together. A second type of bladed disk, known as an integrally bladed disk (or "blisk") is obtained as a single part with no fastening means.

In the first type of bladed disk, the means for fastening the blades to the disk must withstand the centrifugal forces imposed during rotation of the disk, and they therefore tend to be massive. Consequently, such a disk is generally heavier than a blisk. In the aeronautical field, it is preferable to use lightweight parts, and this is why blisks are very beneficial.

DESCRIPTION OF THE PRIOR ART

A first technique for manufacturing a blisk consists in machining such a blisk from a blank obtained by forging. This technique is described in document EP 1 285 714.

A second technique for manufacturing a blisk consists in employing friction welding. Friction welding is a mechanical welding process in which the heat needed for the welding is supplied by rubbing the parts to be assembled against each other while pressing the parts against each other. Advantageously, this welding technique is carried out with no addition of liquid metal.

Applications of friction welding for the manufacture of blisks are illustrated in documents EP 0 924 016 and U.S. Pat. No. 6,524,072. Document EP 0 924 016 describes a blade the frictional movement of which relative to the disk is approximately axial, whereas document U.S. Pat. No. 6,524,072 describes a blade the frictional movement of which relative to the disk is tangential. Other types of frictional movement are conceivable, such as rotation. These processes, which have to be repeated for each blade, are lengthy and tedious.

Furthermore, implementation of the processes described in documents EP 0 924 016 and U.S. Pat. No. 6,524,072 presupposes that it is possible for the blade to undergo sufficient movement relative to the disk. However, some blades include a shroud at their upper end, as opposed to their lower end, which includes a root. A shroud has substantially the shape of a ring sector and makes it possible to reconstitute the external aerodynamic gas flow stream of a turbomachine. A shroud can therefore be likened to an upper platform. It is common practice to design a shroud that is the same for all the blades, this shroud having a shape allowing it to be fitted into the adjacent shrouds. The set of shrouds, joined end to end, form together a ring.

The particular shape of the shrouds prevents application of the known friction welding processes for the manufacture of a blisk since the shroud of an adjacent blade will impede the frictional movement of the shrouded blade to be welded onto the disk. No document of the known prior art has proposed a method of manufacturing shrouded blades on a disk and employing friction welding.

More generally, the same problems may arise for any blades having at least one element coming into contact with at least one neighboring blade, this element possibly being, for example, a lower platform that reconstitutes the inner aerodynamic gas flow stream of a turbomachine or a fin, which can be likened to an intermediate platform as described in document U.S. Pat. No. 5,460,488.

Moreover, a prestress must generally be applied to the shrouded blades, which makes friction welding difficult. The prestressing consists in subjecting the blades to compressive or tensile forces during implementation of the manufacturing process. A shrouded blade is machined directly with an angular twist of its airfoil so that the shrouds are not all oriented in the circumferential alignment of the disk. To obtain this circumferential alignment, when the blades are assembled on the disk via their root, the shrouds are mechanically fastened together, exerting a prestress.

A first objective of the invention is to propose a process for manufacturing a blisk making it possible to weld, especially by friction welding, a plurality of blades having at least one element coming into contact with at least one neighboring blade onto a disk.

A second objective of the invention is to propose a process for manufacturing a blisk by welding, especially friction welding, allowing simultaneous assembly of a plurality of blades on a disk.

The solution proposed by the invention is to weld, by friction welding, a ring of blades, fastened together beforehand, onto a disk.

SUMMARY OF THE INVENTION

For this purpose, the invention provides a process for manufacturing a blisk, comprising the following successive steps:

arrangement of a plurality of blades 1 in the form of a ring in a mold 2 having symmetry of revolution;

casting of a degradable material 3, preheated to a temperature above its melting point, onto the ring of blades 1 in the mold 2;

extraction of the molded ring 10 obtained after the degradable material 3 has solidified;

welding of the molded ring 10 onto a disk 4; and elimination of the degradable material 3.

Advantageously, the welding of the process according to the invention is carried out by friction welding.

Remarkably, the process according to the invention is applicable to blades that include elements coming into contact with the neighboring blades.

The simultaneous welding of all the blades onto the disk saves time in manufacturing the blisk.

The invention also relates to a mold for implementing the above blisk manufacturing process.

BRIEF DESCRIPTION OF THE DRAWINGS

The invention will be more clearly understood and its advantages will become more apparent on reading the detailed description that follows. The description refers to the appended figures, in which.

DESCRIPTION OF THE PREFERRED EMBODIMENTS

Figure 1:
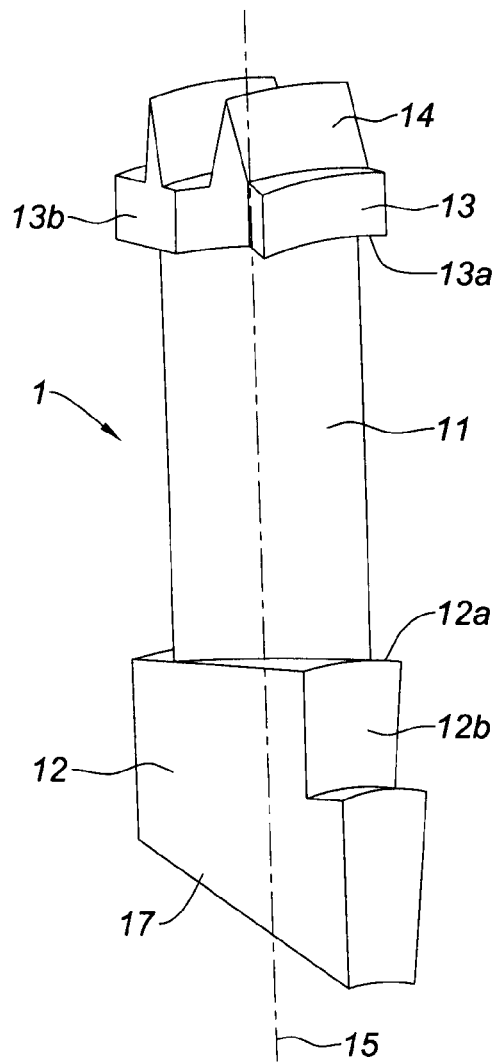
FIG. 1 shows a blade in a substantially profiled view.

As illustrated in FIG. 1, a blade 1 comprises an airfoil 11 and a root 12 at its lower end. The wing-shaped airfoil 11 of the blade 1 was machined beforehand. The root 12 of the blade 1 consists of a relatively massive block. This block has an excess of material on its friction surface 17, which is intended to be consumed during the friction welding. A shoulder 12b is also provided on the root 12 in order to prevent the blade from moving radially during welding.

Figure 2:
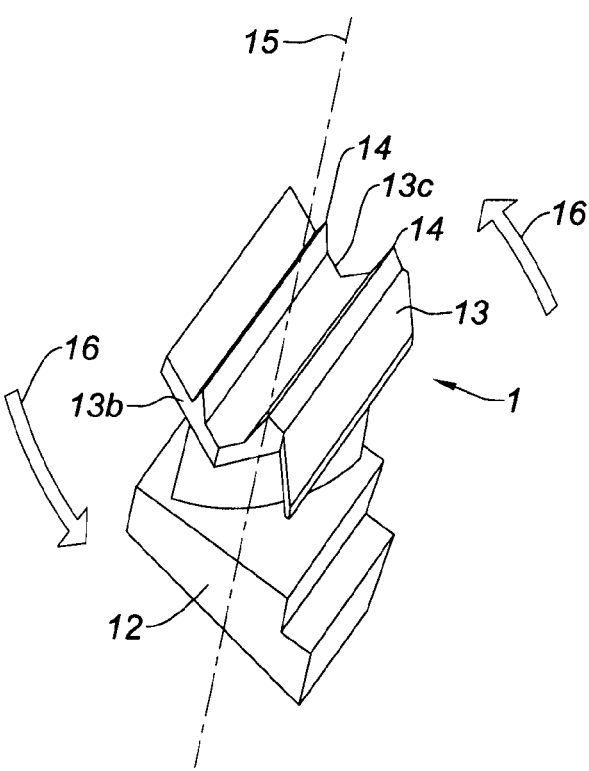
FIG. 2 shows a blade according to FIG. 1 in an elevation view.

In certain cases, a blade 1 further includes, at its upper end, a shroud 13. The lower surface 13a of the shroud 13 makes it possible to reconstitute part of the outer aerodynamic gas flow stream of a turbomachine. As is clearly apparent in FIG. 2, the shapes of the lateral edges 13b and 13c of the shroud 13 are complementary so that the identical shrouds 13 of two adjacent blades 1 can fit together. The particular shape of the shrouds 13 prevents any movement at the tip of the blade 1. The shroud 13 may include, at its top, teeth 14 intended to seal with a casing shell placed opposite when the blisk is installed in a turbomachine. A blade 1 with a shroud 13 is generally machined with a slight twist 16 of its airfoil 11 along a radial axis 15.

Figure 3:
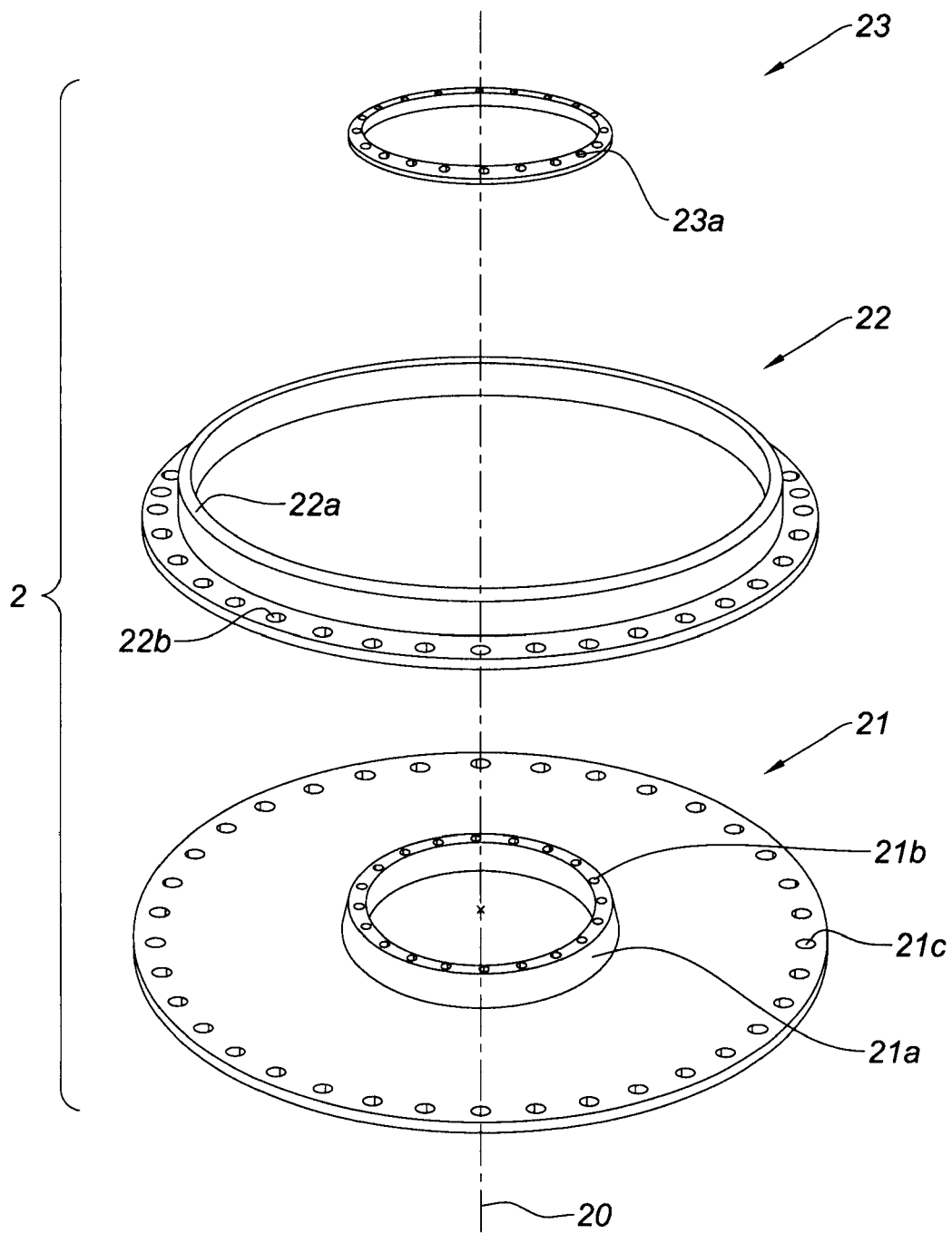
FIG. 3 shows, in exploded view, the various constituent elements of the mold according to the invention.

An example of a mold 2 is shown in FIG. 3 in exploded view. The various elements making up the mold are removable and preferably axisymmetric about an axis 20. The mold 2 comprises a bottom ring 21, an outer ring 22 and a top ring 23.

The bottom ring 21, of plane shape, is provided on its internal periphery with an annular wall 21a extending axially toward the inside of the mold 2 over a height corresponding to the "width" of the blades. The outer ring 22 includes, on its internal periphery, an external annular wall 22a extending axially toward the inside of the mold 2. The top ring 23, of plane shape, is intended to keep the blades 1 firmly in place in the mold 2 by exerting pressure on the roots 12 of the blades 1. The bottom ring 21, the outer ring 22 and the top ring 23 may be fastened together by bolted connections. For this purpose, tappings 21b, 21c, 22b, 23a are provided on each of these elements. The dimensions of the various elements 21, 22, 23 of the mold 2 depend on the dimensions of the blades 1.

In order to implement the process for manufacturing a blisk according to the invention, the blades 1 and the disk 4 are manufactured beforehand.

Figure 4:
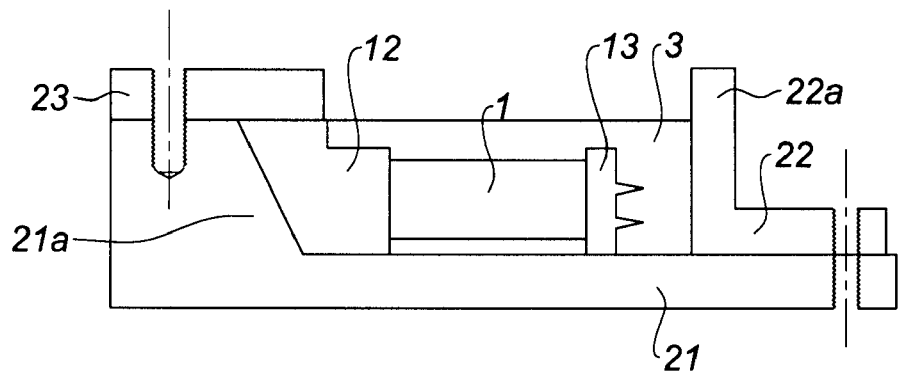
FIG. 4 shows a partial sectional view of the assembled mold according to the invention in which a blade is placed.

In a first step of implementing the process according to the invention, the blades 1 must be arranged in the form of a ring in the same radial positions relative to the axis 20 of the mold 2 on the bottom ring 21 as in their final arrangement around the disk 2 onto which they will be joined. The roots 12 of the blades come into contact with the wall 21a of the bottom ring 21 via their surface 17. A prestress is exerted on the blades 1 by the top ring 23 being pressed onto the roots 12 of the blades 1, thereby forcing the shrouds 13 to be circumferentially aligned in such a way that the lateral edges 13b and 13c are correctly positioned and fit together. FIG. 4 shows in cross section the mold 2 in which a blade 1 is placed.

According to a second step of the process, the degradable material 3, preheated to a temperature above its melting point, is poured so as to cover at least the airfoils 11 and the shrouds 13 of the blades 1. The material 3 is a low-melting-point material. The term "low-melting-point material" is understood within the context of the present invention to mean a material having a melting point below that of the constituent material of the blades 1 or the disk 4. Examples of such a degradable material 3 will be described below.

According to a third step of the process, the molded ring 10 is extracted after the material 3 has been left to cool until it solidifies. To do this, the various elements 21, 22 and 23 of the mold 2 are removed. The molded ring 10 obtained is then a ring containing the prestressed blades 1. Preferably, the possible imperfections of the molded ring 10 are removed by deflashing.

The fourth step of the process consists in carrying out the friction welding of the molded ring 10. The friction surfaces 17 and 41 of the molded ring 10 and of the disk 4 are bevelled and both possess a complementary frustoconical shape. The surplus material provided on the friction surfaces 17 and 41 is intended to be consumed during the friction welding. The friction welding is carried out by a relative rotation of the molded ring 10 and the disk 4. A shoulder 12b is provided on the root 12 to prevent the blade from moving radially.

Figure 5:
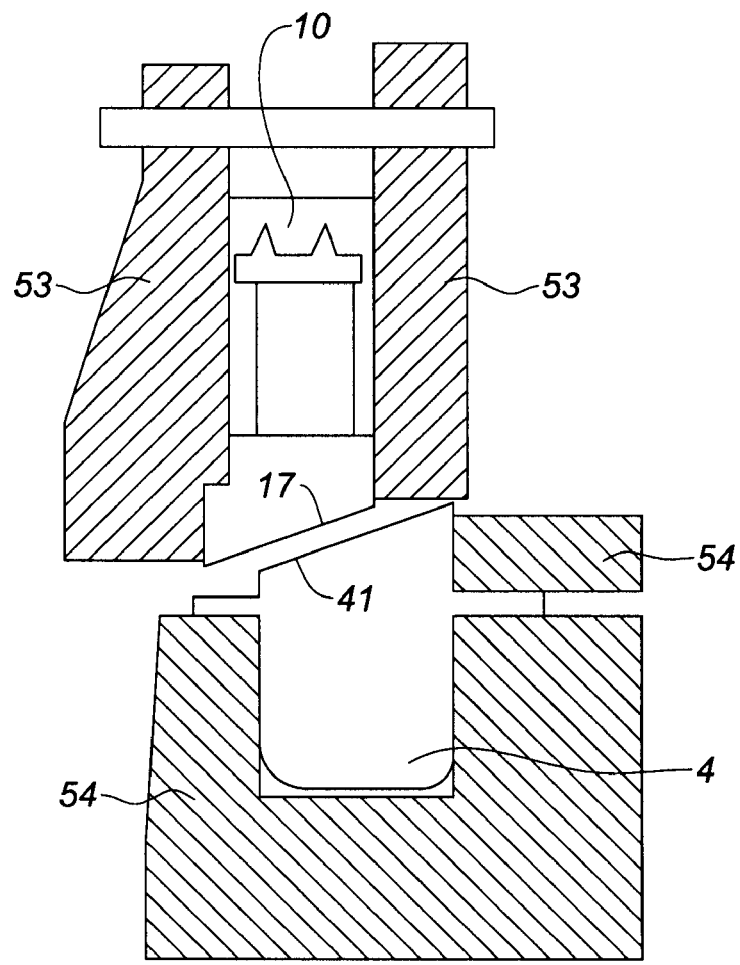
FIG. 5 shows a molded ring and a disk that are intended for friction welding.

Two embodiments are possible. In a first embodiment, the disk 4 is rotated at high speed and the molded ring 10 is pressed axially against the disk 4. Alternatively, in a second embodiment, the molded ring 10 is rotated at high speed and the disk 4 is pressed axially against the molded ring 10. To do this, the molded ring 10 and the disk 4 are held by respective holding devices 53 and 54, for example chocks, during the friction welding operation. FIG. 5 illustrates a molded ring 10 and a disk 4 in their positions before welding.

The type of friction welding applied may advantageously be inertial friction welding. In this case, the rotation speed is predetermined so that, when the initiated rotation stops, the anticipated welding is accomplished sufficiently.

After the welding operation, the last step of the process consists in removing the degradable material 3. This removal may be carried out chemically or thermally, depending on the type of degradable material 3 employed. For removal by chemical dissolution, the degradable material 3 may be a resin of the polyurethane or silicone type soluble in an organic solvent of the toluene type. For thermal removal, the material may be a metal alloy based on lead-tin of the Seroban® type. Once the degradable material 3 has been removed, the shrouds 13 are then freed of the prestress and remain circumferentially aligned.

The blisk obtained may undergo other additional finishing treatments, such as machining in the weld zone and machining of the airfoil 11 of the blades 1.

Although the example described above refers essentially to blades 1 comprising a shroud 13, the process according to the invention is applicable to any type of blade with or without elements coming into contact with the neighboring blades.

Although the welding process proposed is friction welding, other welding processes could be envisioned, such as arc welding, laser welding or diffusion welding.

The invention claimed is:

1. A process for manufacturing a blisk, comprising:
   arranging a plurality of blades in the form of a ring in a mold with symmetry of revolution, each of the blades including a shroud and a root, the shroud disposed at an upper end of the blade and an airfoil machined with a twist along a radial axis, and the root includes a shoulder disposed at a front end of the root which cooperates with a holding device to prevent the blade from moving radially during welding, and a friction surface which is consumed during welding;
   casting a degradable material, preheated to a temperature above its melting point, onto the ring of blades arranged in the mold;

wherein the mold includes a bottom ring, an outer ring, and a top ring, the bottom ring includes an annular wall disposed at an inner periphery of the bottom ring and extends axially toward an inside of the mold, and the plurality of blades are arranged such that the friction surface of each of the blades contact the annular wall, and the top ring is of plane shape and is fastened to the bottom ring;

extracting a molded ring which is obtained after the degradable material has solidified;

welding the molded ring onto a disk;

eliminating the degradable material, wherein the welding is performed by friction welding, wherein the plurality of blades are arranged such that a lateral edge of the shroud of each of the blades abuts a corresponding lateral edge of the shroud of an adjacent blade and a prestress is exerted on the blades, and the top ring presses the root of each of the blades to exert the prestress on the blades when the top ring is fastened to the bottom ring.

2. The process for manufacturing a blisk as claimed in claim 1, wherein the welding is performed by inertial friction welding.

3. The process for manufacturing a blisk as claimed in claim 1, wherein the friction surfaces of the molded ring and of the disk are beveled and include a complementary frusto-conical shape.

4. The process for manufacturing a blisk as claimed in claim 1, wherein, during the friction welding operation, the disk is pressed axially against the molded ring.

5. The process for manufacturing a blisk as claimed in claim 1, wherein a melting point of the degradable material is lower than a melting point of the material of the blades or the disk.

6. The process for manufacturing a blisk as claimed in claim 5, wherein the degradable material is eliminated chemically or thermally.

7. The process for manufacturing a blisk as claimed in claim 6, wherein the degradable material is a resin.

8. The process for manufacturing a blisk as claimed in claim 7, wherein the resin is based on a polyurethane or silicone.

9. The process for manufacturing a blisk as claimed in claim 6, wherein the degradable material is a metal alloy.

10. The process for manufacturing a blisk as claimed in claim 9, wherein the alloy is based on lead-tin.

11. The process for manufacturing a blisk as claimed in claim 1, wherein a top of the shroud includes sealing teeth.

12. The process for manufacturing a blisk as claimed in claim 1, further comprising machining the airfoils and weld zone after eliminating the degradable material.

* * * * *